US010158479B2

(12) United States Patent
Chapman et al.

(10) Patent No.: US 10,158,479 B2
(45) Date of Patent: Dec. 18, 2018

(54) SYSTEMS AND METHODS FOR GENERATING, UPLOADING AND EXECUTING CODE BLOCKS WITHIN DISTRIBUTED NETWORK NODES

(71) Applicant: NORTHERN TRUST CORPORATION, Chicago, IL (US)

(72) Inventors: Justin Chapman, London (GB); Andrew Czupek, Chicago, IL (US); Andrew Monks, Chicago, IL (US); Anthony Stevens, Herefordshire (GB); Arijit Das, Napersville, IL (US); Christopher Price, Plainfield, IL (US); Wayne Hannaway, Westclif-On-Sea (GB); Zabrina Smith, London (GB)

(73) Assignee: Northern Trust Corporation, Chicago, IL (US)

( * ) Notice: Subject to any disclaimer, the term of this patent is extended or adjusted under 35 U.S.C. 154(b) by 0 days.

(21) Appl. No.: 15/846,012

(22) Filed: Dec. 18, 2017

(65) Prior Publication Data
US 2018/0227116 A1 Aug. 9, 2018

Related U.S. Application Data

(60) Provisional application No. 62/455,532, filed on Feb. 6, 2017.

(51) Int. Cl.
*H04L 29/00* (2006.01)
*H04L 9/06* (2006.01)
(Continued)

(52) U.S. Cl.
CPC ............ *H04L 9/0637* (2013.01); *G06F 9/451* (2018.02); *G06F 9/542* (2013.01); *G06F 17/30345* (2013.01); *H04L 9/0643* (2013.01)

(58) Field of Classification Search
CPC ............... H04L 63/061; H04L 63/0442; H04L 63/0435; H04L 63/062; H04L 2209/38
See application file for complete search history.

(56) References Cited

U.S. PATENT DOCUMENTS 9,824,031 B1 * 11/2017 Ganti .................. G06F 12/1408
2015/0332283 A1    11/2015 Witchey
(Continued)

FOREIGN PATENT DOCUMENTS

WO         2017070753 A1      5/2017

OTHER PUBLICATIONS

StakeVentures, "Simple Convention for Human Readable Terms for Smart Contracts", https://blog.stakeventures.com/articles/smart-contract-terms, Jun. 29, 2016, 5 pages.
(Continued)

*Primary Examiner* — Ghazal B Shehni
(74) *Attorney, Agent, or Firm* — Eric L. Sophir; Dentons US LLP (57) ABSTRACT

Embodiments disclosed herein describe systems and methods for deploying a new code block on a blockchain. In an embodiment, an application server may provide a user with a graphical user interface (GUI) with contract components and document components. The application server may generate an assembled contract text based on the user selecting the contract and document components. The application server may determine the blockchain addresses or local addresses of smart contract components corresponding to the contract components and the documents components. The application server may generate a code block including references to the addresses of the smart contracts and the document components or containing the executable code itself and may deploy the code block to the latest valid blockchain. The application server may execute the smart
(Continued)

contract in the code block based in response to a digital event trigger.

20 Claims, 4 Drawing Sheets

(51) Int. Cl.
*G06F 9/54* (2006.01)
*G06F 9/451* (2018.01)
*G06F 17/30* (2006.01)

(56) References Cited

U.S. PATENT DOCUMENTS

| | | | |
|---|---|---|---|
| 2015/0379510 A1 | 12/2015 | Smith | |
| 2016/0098723 A1* | 4/2016 | Feeney | G06Q 20/4016 705/75 |
| 2016/0261411 A1 | 9/2016 | Yau et al. | |
| 2016/0275461 A1 | 9/2016 | Sprague et al. | |
| 2016/0292672 A1 | 10/2016 | Fay et al. | |
| 2016/0292680 A1 | 10/2016 | Wilson, Jr. et al. | |
| 2016/0321434 A1 | 11/2016 | McCoy et al. | |
| 2016/0335533 A1 | 11/2016 | Davis et al. | |
| 2017/0046526 A1 | 2/2017 | Chan et al. | |
| 2017/0048209 A1* | 2/2017 | Lohe | H04L 63/0442 |
| 2017/0098291 A1 | 4/2017 | Code et al. | |
| 2017/0148016 A1* | 5/2017 | Davis | G06Q 20/3827 |
| 2017/0177855 A1 | 6/2017 | Costa Faidella et al. | |
| 2017/0213209 A1* | 7/2017 | Dillenberger | G06Q 20/3829 |
| 2017/0279774 A1 | 9/2017 | Booz et al. | |

OTHER PUBLICATIONS

Clack, Smart Contract Templates: foundations, design landscape and research directions, https://arxiv.org/pdf/1608.00771.pdf, Aug. 2016, 15 pages.
Rush, Faster, Richer, Fully Customizable Data from Programmable Blockchains, https://quickblocks.io/wp-content/uploads/2017/10/2017-Rush-Faster-Richer-Fully-Customizable-Data-from-Programmable-Blockchains.pdf, Jan. 28, 2017, 37 pages.
Someone235, "The Basic Smart Contract Sample", https://github.com/ibm-watson-iot/blockchain-samples/tree/master/contracts/basicisimple_contract, 2015, 12 pages.
Hypernephelist, "A Simple Smart Contract Web", http://hypernephelist.com/2016/06/21/a-simple-smart-contract-ui-web3.html, Jun. 2016, 6 pages.
Chainskills, "Create and Deploy a Smart Contract (6/6)", http://chainskills.com/2017/04/03/create-and-deploy-a-smart-contract-66/, 2017, 18 pages.
Wall et al., Using Blockchain Technology and Smart Contracts to Create a Distributed Securities Depository, retrieved from the Internet: http://www.eit/lth.se/sprapport.php?uid=987, 2016, 90 pages.
Srisukvattananan, "Overview of Blockchain and Possible Use Cases in the Thai Payment System", retrieved from the Internet: https://dspace.mit.edu/bitstream/handle/1721.1/104513/958296233-MIT.pdf?sequence=1, Nov. 2016, 51 pages.
Kakavand et al., The Blockchain Revolution: An Analysis of Regulation and Technology Relaed to Distributed Ledger Technologies:, retrieved from the Internet: https//papers.ssm.com/sol3/papers.cfm??abstract_id=2849251, Oct. 12, 2016, 27 pages.
Transmittal of International Search Report and Written Opinion, dated Mar. 1, 2018, in International Application No. PCT/US2017/067175, 15 pages.
Multichain, "Creating and connecting to a blockchain" [online blog], Jan. 4, 2016 [retrieved Feb. 13, 2018]. Retrieved from the Internet Archive: <URL: https://web.archive.org/web/20160104235425/https:/www.multichain.com/developers/creating-connecting/>, 3 pages.

\* cited by examiner

SYSTEMS AND METHODS FOR GENERATING, UPLOADING AND EXECUTING CODE BLOCKS WITHIN DISTRIBUTED NETWORK NODES

CROSS-REFERENCE TO RELATED APPLICATIONS

This application claims priority to U.S. Provisional Patent Application Ser. No. 62/455,532, filed on Feb. 6, 2017, which is hereby incorporated by reference in its entirety.

TECHNICAL FIELD

This application relates generally to systems and methods for generating and deploying a code block in a distributed database environment and executing the code block based upon one or more digital event triggers.

BACKGROUND

Distributed databases such as distributed ledgers ensure the integrity of data by generating a chain of data blocks linked together by cryptographic hashes of the data records in the data blocks. For example, a cryptographic hash of at least a portion of data records within a first block, and, in some cases, combined with a portion of data records in previous blocks is used to generate the block address for a second block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that can be used to track the updates to the data records contained therein. The linked blocks (or blockchain) may be distributed among multiple network nodes within a computer network such that each node may maintain a copy of the blockchain. Malicious network nodes attempting to compromise the integrity of the database have to recreate and redistribute the blockchain faster than the honest network nodes, which, in most cases, is computationally infeasible. In other words, data integrity is guaranteed by the virtue of multiple network nodes in a network having a copy of the same blockchain. A central trust authority is therefore not required to vouch for the integrity of the distributed database hosted by multiple nodes in the network.

In addition to the data records, a block in a blockchain may contain a smart contract, which is a code that may be executed by a network node hosting the blockchain. A smart contract may dictate the processing of one or more data records within the blockchain. The smart contract may be based upon one or more text documents contained within files format. However, conventional systems have several technical shortcomings, that is, there are several technical problems not addressed by current blockchain technology. One problem is how to provide a functionality to generate smart contracts from text documents and deploy the generated contracts to the blockchain. Another problem is how to provide a network interface that communicates with the distributed database to intelligently generate smart contracts, deploy the smart contracts to the blockchain, and retrieve the smart contracts from the blockchain.

SUMMARY

What is therefore desired is a system and a method that provides an interactive user interface and a backend code library to allow a system user to generate and deploy smart contracts. What is further required is a system and method for automatic and intelligent execution of the smart contracts based upon digital event triggers detected by one or more network nodes.

The systems and methods disclosed herein are intended to address the shortcomings in the art mentioned above, but may also provide additional or alternative benefits as well. Embodiments disclosed herein describe systems and methods for deploying a new smart contract block (or a code block) on a blockchain and executing the code in the smart contract block based upon one or more digital event triggers. For example, an application server, hosted by a network node in some instances, may provide a user with a graphical user interface (GUI) with contract components, document components, and template for structuring the contract and document components. The application server may generate an assembled contract text based on the user selecting the contract and document components, and structuring the same within the template. The application server may determine the addresses of smart contracts corresponding to the contract components and the documents components in the blockchain. In some embodiments, the application server may generate a smart contract block (or code block) including references to the addresses of the smart contracts and the document components. In other embodiments, the application server may generate a smart contract block (or code block) containing the smart contracts and the document components themselves. The application server may deploy the smart contract block (or code block) to the latest valid blockchain. The systems and methods disclosed herein may further execute a smart contract (or smart code) in the deployed smart contract block based upon detecting one or more digital event triggers, generate outputs based on the execution of the smart contract, update multiple database records, and/or deploy the generated outputs into the blockchain as a data block.

In an embodiment, a computer implemented method for generating and deploying a code block in a blockchain comprises: rendering, by a network node, a graphical user interface (GUI) containing a plurality of contract components and a plurality of document components retrieved from a library database of contract and document components; generating, by the network node, an assembled contract text based on a selection of at least one contract component from the plurality of contract components or at least one document component from the plurality of document components; retrieving, by the network node, an address of an executable code corresponding to the at least one contract component or an address of a text of the at least one document component from the library database of contract and document components; retrieving, by the network node, a first latest valid blockchain based upon a first polling of a plurality of network nodes using a consensus threshold; generating, by the network node, a code block containing the address of the executable code corresponding to the at least one contract component or the address of the text of the at least one document component; generating, by the network node, a block address for the code block based upon a cryptographic hash value of at least a portion of data records of the last block of the first latest valid blockchain; and appending, by the network node, the code block at the generated block address in the first latest valid blockchain.

In another embodiment, a computer implemented method for generating and deploying a code block in a blockchain comprises: rendering, by a network node, a graphical user interface (GUI) containing a plurality of contract components and a plurality of document components retrieved from a library database of contract and document components; generating, by the network node, an assembled contract text based on a selection of at least one contract component from the plurality of contract components or at least one document component from the plurality of document components; retrieving, by the network node, an executable code corresponding to the at least one contract component or a text of the at least one document component from the library database of contract and document components; retrieving, by the network node, a first latest valid blockchain based upon a first polling of a plurality of network nodes using a consensus threshold; generating, by the network node, a code block containing the executable code corresponding to the at least one contract component or the text of the at least one document component; generating, by the network node, a block address for the code block based upon a cryptographic hash value of at least a portion of data records of the last block of the first latest valid blockchain; and appending, by the network node, the code block at the generated block address in the first latest valid blockchain.

In another embodiment, a system for generating and deploying a code block in a blockchain comprises: a plurality of network nodes, each including a non-transitory storage medium storing a respective local copy of a blockchain; at least one of the plurality of network nodes having a processor configured to: rendering a graphical user interface (GUI) containing a plurality of contract components and a plurality of document components retrieved from a library database of contract and document components; generate an assembled contract text based on a selection of at least one contract component from the plurality of contract components or at least one document component from the plurality of document components; retrieve an executable code corresponding to the at least one contract component or a text of the at least one document component from the library database of contract and document components; retrieve a first latest valid blockchain based upon a first polling of a plurality of network nodes using a consensus threshold; generate a code block containing the executable code corresponding to the at least one contract component or the text of the at least one document component; generate a block address for the code block based upon a cryptographic hash value of at least a portion of data records of the last block of the first latest valid blockchain; and append the code block at the generated block address in the first latest valid blockchain.

BRIEF DESCRIPTION OF THE DRAWINGS

The accompanying drawings constitute a part of this specification and illustrate embodiments of the subject matter disclosed herein.

DETAILED DESCRIPTION

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein provide a novel approach to generating, deploying, and updating smart contracts (or smart code) in a blockchain. The embodiments further provide a novel approach to automatic and intelligent execution of the deployed smart contracts. In doing so, the embodiments provide a significant improvement over the conventional blockchain technology. As mentioned above, conventional blockchain technology does not provide an interface to efficiently generate smart contracts based upon text based contracts and does not provide tools (e.g., on a user interface) for a system user to dynamically generate smart contracts. The systems and methods disclosed herein generate and render an intelligent interface for a system user to generate a smart contract based on a text based contract. For example, a system may provide an interface, for example, a graphical user interface (GUI) such as a WYSIWIG screen and a back-end smart contracts library. In the interface, the system may provide a tool to allow a system user to generate a text based contract. The text based contract may use smart contract terms already stored in the smart contracts library to assemble a contract based on standardized or customized terms.

The user interface may provide a graphical template for a system user to generate a text based contract using a plurality of graphical tools also provided by the user interface. The template may render a structural arrangement for the terms and conditions to be defined and incorporated into the text based contract. The plurality of graphical tools may include, for example, icons, windows, drop down boxes, dialog boxes, radio buttons to be used by the system user in association with the template to generate an integrated text based contract, which the system can convert to a smart contract. The plurality of graphical tools may also include a text editor for the system user to manually enter terms and conditions of a text based contract. The back-end smart contracts library may support the plurality of graphical tools and other elements of the user interface. In response to the system user selecting or interacting with one or more graphical tools or other elements in the user interface, the system may invoke the associated program module and database record in the smart contracts library. Furthermore, the user interface may also provide an upload feature for a system user to upload a text file containing a text based contract.

The system may also maintain the back-end smart contracts library. The back-end smart contracts library may comprise a plurality of database records containing one or more conditions of a text based contract and the corresponding executable codes. Furthermore, the smart contracts library may contain one or more text documents. The text based documents may provide further non-executable information (e.g., a glossary) related to the one or more conditions. The system may render the one or more conditions and the one or more text documents in the interface. When the user selects the one or more conditions, the system may use the library to retrieve the corresponding executable codes. In some embodiments, the blockchain may contain the executable codes and the library may store the block address of the executable code corresponding to one or more conditions. Furthermore, the system may intelligently configure and update the library based on the inputs from the system users. For example, a system user may define a new condition and input an executable code to implement the condition and the system may automatically update the smart contracts library with the new define condition and the corresponding executable code.

As mentioned above, in some embodiments, the system may maintain the back-end smart contracts library in the blockchain. In other words, the executable codes pertaining to one or more conditions in the text based contracts may be stored in one or more blocks of the blockchain. The local library database may contain the respective block addresses of the executable codes within the blockchain. Therefore, when the system generates a smart contract block and deploys the same to the blockchain, the smart contract block may contain the address of the one or more blocks containing the executable codes as opposed to containing an executable code itself. However, in some instances, the system may download the executable code from the one or more blocks of the blockchain and include the downloaded executable code to generate a new smart contract block. One having ordinary skill in the art understands that these embodiments are merely exemplary, and not intended to be limiting, and other embodiments of the smart contracts library, such as the one described below, should be considered within the scope of this disclosure.

In other embodiments, the system may maintain the executable codes in a smart contracts local library, that is, the executable codes may be stored locally. The executable codes may pertain to one or more conditions to be included in a smart contract block. In some instances, to generate a new smart contract block with one or more conditions, the system may include the local addresses of the respective executable codes in the new smart contract block. In other instances, to generate a new smart contract block, the system may retrieve the executable code using the local address and include the executable codes in the smart contract block.

One or more network nodes in the system may monitor for one or more digital event triggers. The digital event triggers may be a part of a smart contract and the executable code implementing the digital event triggers may be running locally on the network node. The digital event triggers may be detected by the system and/or generated within the system. In some instances, one or more network nodes may detect a digital event trigger from an external source. In other instances, a first network node may generate a digital event trigger and a second network node may detect the digital event trigger depending upon the configuration of the first and second network nodes. The digital event triggers may include, for example, a predetermined date, a predetermined point or duration of time, a predetermined number within a counter, an outcome of an intelligent autocalculation, an outcome of an API event, an outcome of a blockchain event, a user action on a web interface, and an input from an admin user. Other examples of digital event triggers include generation and/or expiration of one or more digital tokens such as payment obligation tokens. A payment obligation token or alternatively, a digital payment token may be a data record containing one or more data fields with pieces of information associated with a payment obligation. For example, the one or more data fields may contain information of a payment amount, a payee-user, and a payor-user. As mentioned above, a digital event trigger may be a part of a smart contract. Accordingly, system may render for system user selection, one or more digital event triggers when the system user is assembling a contract to be converted into a smart contract.

When a network node detects and/or receives a digital event trigger, the network node, either by itself or in conjunction with other network nodes, may automatically execute the associated smart contract. To do so, the network node may download the latest valid blockchain or a portion thereof. The network node may implement a consensus algorithm to validate the latest blockchain, such as a protocol to measure agreement of data between different nodes. For example, for system critical data and functionality, the network may implement a higher consensus threshold, for example 95%, to ascertain that the downloaded blockchain is, in fact, valid. For less critical data and functionality, the network node may implement a lower consensus threshold, for example 60%, to ascertain the validity of the downloaded blockchain. Once the network node has downloaded and validated the latest blockchain, the network node may retrieve a smart contract block (or a code block) associated with the digital event trigger. The smart contract block may contain an executable code and/or may contain a reference address to the executable code. The network node may then execute the executable code in the smart contract block or retrieved from the reference address to generate one or more outputs based on the digital event triggers. Furthermore, the network node may update one or more databases upon execution of the executable code. The database updates may be within a local database or a database update to the blockchain, in which case the network node may generate a new block with the updates and append the new block to the blockchain. In addition or in the alternative, the network node may generate a new block with the outputs and append the new block to the blockchain.

Figure 1:
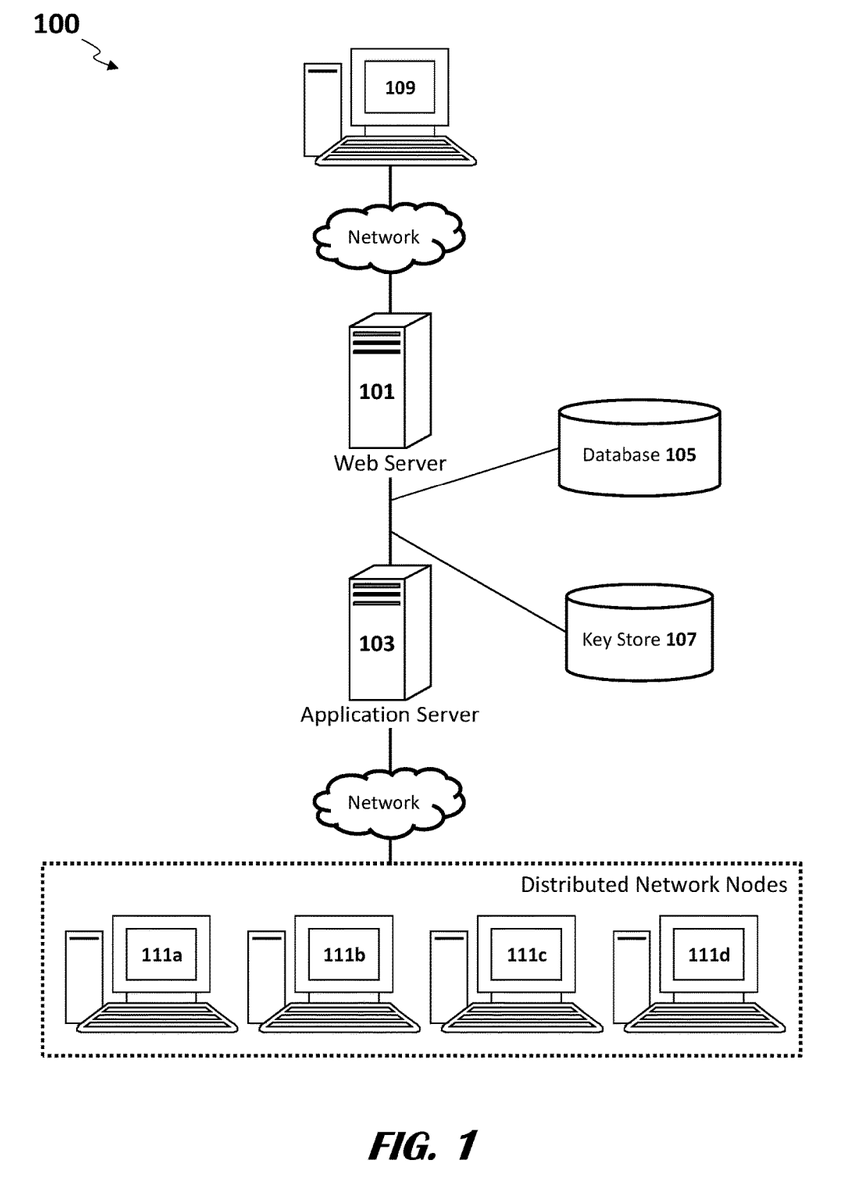
FIG. 1 shows an exemplary system 100 for deploying a code block on a blockchain, according to an exemplary embodiment.

FIG. 1 shows components of an exemplary system 100, according to an exemplary embodiment. The exemplary system 100 may comprise a webserver 101, an application server 103, databases 105, a key store 107, a client device 109, and distributed network nodes 111. The system 100 may employ and manage a system blockchain, sometimes referred to as a "distributed ledger." The system blockchain may operate as a distributed database that stores data records associated with users and transaction documents, where the data records stored on the system blockchain may be blocks of data that are hosted on distributed network nodes 111. It should be appreciated that the data stored in records within system databases 105 may vary from the data stored in blocks of the system blockchain hosted on network nodes 111. In some embodiments, the system blockchain may be a private party blockchain. In other embodiments, the system blockchain may be a public blockchain.

A webserver 101 may host a website accessible to end users, where the system 100 may control the content presented via the various webpages based upon each particular user's role and/or permissions. The webserver 101 may be any computing device comprising a processor and non-transitory machine-readable storage capable of executing the various tasks and processes described herein. Non-limiting examples of such computing devices may include workstation computers, laptop computers, server computers, and the like. While the exemplary system 100 includes a single webserver 101, one having skill in the art would appreciate that some embodiments the webserver 101 may include any number of computing devices operating in a distributed computing environment.

The webserver 101 may execute software applications configured to host a website (e.g., Apache®, Microsoft IIS®), which may generate and serve various webpages to client devices 109. The client devices 109 may use the website to generate and access data stored on a system database 105 or in a blockchain hosted by nodes 111 of the system 100. In some implementations, the webserver 101 may require user authentication based upon a set of user authorization credentials (e.g., username, password, biometrics, cryptographic certificate). In such implementations, the webserver 101 may access a system database 105 configured to store user credentials, which the webserver 101 may reference in order to determine whether a set of entered credentials (purportedly authenticating the user) match an appropriate set of credentials that identify and authenticate the user. Similarly, in some implementations, the webserver 101 may generate and serve webpages to a client device 109 based upon a user role within the system 100 (e.g., administrator, investor, investment promoter). In such implementations, the user role may be defined by data fields in user records stored in the system database 105, and authentication of the user and user role may be conducted by the webserver 101 by executing an access directory protocol (e.g., LDAP). The system 100 may instruct the webserver 101 to generate webpage content, access or generate data stored in the system database 105, and access or generate data stored in the system blockchain, according to the user role defined by the user record in the system database 105.

An application server 103 may generate, access, and update blockchain instances hosted on system nodes 111, according to instructions received from a client device 109 via a webserver 101. The application server 103 may be any computing device comprising a processor and non-transitory machine-readable storage capable of executing the various tasks and processes described herein. Non-limiting examples of such computing devices may include workstation computers, laptop computers, server computers, and the like. While the exemplary system 100 includes a single application server 103, one having skill in the art would appreciate that in some embodiments the application server 103 may include any number of computing devices operating in a distributed computing environment. It would also be appreciated that although the application server 103 is shown in FIG. 1 as being a separate device from a webserver 101, in some embodiments the webserver 101 and the application server 103 may be the same device.

Software executed by the application server 103 may provide blockchain services to users interacting with the application server 103 via the webserver 101. The application server 103 may update and query record in the system database 105 according to the instructions received from the client device 109. The application server 103 may then generate blocks for the system blockchain, where the blocks contain data from the records of the system database 105. The application server may then update a local instance of the system blockchain, and subsequently instruct network nodes 111 to update the instances of the system blockchain stored locally on each of the network nodes 111. Each new block may include a timestamp or other data that links the new block with existing blocks on the blockchain. As an example, when the application server 103 generates a new digital identity record, the application server 103 may then generate a new block containing the digital identity record and an address for the new block based upon a one directional cryptographic hash of one or more data fields of the digital identity record. The application server 103 may then append the new block in the system blockchain within the local instance of the blockchain stored in the application server 103. The application server 103 may then transmits the new block to each respective network node 111. The network nodes 111, in turn, may update the local instances of the blockchain stored on each of the network nodes 111. In other implementations, the application server 103 may transmit the blockchain or portions thereof to the network node 111, and the network nodes may accordingly replace the local instances of the system blockchain or portions thereof using the transmission received from the application server 103.

In operation, when a user instructs the application server 103 to conduct a transaction requiring a query of the blocks of the blockchain, the application server 103 may conduct a poll of the network nodes 111 to identify the queried data, based on the hash values identifying the blocks, and then determine whether the data within the identified blocks is accurate. The application server 103 may then await a response from a predetermined quorum of network nodes 111 to confirm the data in the blocks; the application server 103 may then proceed with a processing transaction using the data blocks of the blockchain, provided that a predetermined threshold number of network nodes 111 indicate that the blocks at issue match the blocks of the instance stored locally on each of the network nodes 111.

The application server 103 may generate block addresses for data to be retrieved from blockchain instances of the system blockchain. Machine-readable computer files containing various forms of documents (e.g., PDF, DOC, XLS) may be uploaded to the application server 103 via a webserver 101, or otherwise stored into a system database 105, after which the application server 103 may generate a hash value of the document, where the application uses the hash value or other identifier value to reference the file from a system database 105. The application server 103 may then generate the block address for the file by generating a hash of the document and a hash value of the immediately preceding block data or block address. This block address may then be stored into the system database 105 in a document record along with the file and any number of additional data field entries related to the computer file. In operation, the application server 103 or network nodes 111 may reference the block of the blockchain containing the file according to the block address. The application server 103 may generate additional blocks and corresponding block addresses on the system blockchain in a similar manner—e.g., generating a hash value for a block containing user data and then generating a new block address using the block address of the preceding block. One having skill in the art will appreciate that block addresses may be generated in any number of combinations of hashed block data and/or hashed block addresses from the new block and one or more preceding blocks, such that the address of the new block is dependent upon, or otherwise linked to, at least the immediately preceding block.

In some implementations, a system blockchain may contain smart contracts, which are executable coded scripts that instruct the application server 103 and/or network nodes 111 to perform predetermined processes when certain conditions, as indicated by the smart contract, are satisfied. In some instances, these processes instruct the application server 103 and/or network nodes 111 to generate a new block on the blockchain, often superseding the information found in existing blocks in the system blockchain.

For example, in some implementations, the system 100 may employ a smart contract to control user access to machine-readable computer files stored on the system blockchain and/or in a system database 105. The smart contract may comprise code functioning logically as a matrix table for user permissions that associates users or user roles with documents contained within the computer files stored in the system database 105. In such implementations, the smart contract may comprise machine-readable software code that includes instructions for the application server 103 and network nodes 111, and, in some cases, block addresses for blocks on the system blockchain for blocks containing digital identity record user role rules in the system database 105 or application server, and/or document records in the system database 105, among other types of data. When the application server 103 receives a document request from a user device 109, to determine whether the user may access the requested document, the application server 103 may reference a block address containing the digital identity record associated with the user that may contain the permission rules or user role, and/or a block address for the smart contract containing the permissions rules. The application server 103 is instructed by the smart contract whether to retrieve the document from the system database 105 according to the user role, or other user identifier mapping the user or user role to the requested document. The application server 103 may retrieve the document file from the system database 105 upon determining from the smart contract permission data that the user or user role is associated with the document requested.

As mentioned, some embodiments may comprise a system database 105 hosted on one or more computing devices, where the system database 105 may store data records associated with various aspects of the application services offered to end users. Non-limiting examples of what may be stored in the system database 105 may include: user records that may comprise data fields describing users (e.g., user data), such as user credentials (e.g., username, passwords, biometrics, encryption certificates), block addresses for blocks on the system blockchain, user account data, user roles or user permissions; document records that may comprise machine-readable computer files (e.g., word processing files), parsed portions of such computer files, or metadata associated with computer files; and application data that may include software instructions executed by an application server 103 or data used by the such applications executed by the application server 103. The system database 105 may be hosted on any number computing devices comprising a non-transitory machine-readable storage medium and capable of performing the various tasks described herein. As shown in FIG. 1, the system database 105 may be accessed by a webserver 101 and/or an application server 103 via one or more networks. But one having skill in the art would appreciate that the system database 105 may be hosted on the same physical computing device functioning as a webserver 101 and/or functioning as an application server 103.

In some embodiments, the system 100 may store a digital identity record for a user or an entity within the system blockchain. To do so, the system 100 may allow an admin user to generate digital identity templates of different types based on the entity. The template may include mandatory data fields and supplemental data fields. The system 100 may store the templates within the system blockchain and/or in the databases 105. When the system 100 receives a request to generate a digital identity record for an entity, the system 100 may retrieve a digital identity template, either from the system blockchain or from the databases 105, based on the type of the entity. The system 100 may generate a digital identity record based upon the respective digital identity template. The system 100, through one or more network nodes 111, may prompt the entity to enter the information required for data fields in the generated digital identity record. Furthermore, one or more of the data fields of the digital identity record may have an independent status, and the system 100 or a trusted third party server may update the status of the digital identity record. The digital identity record may include one or more one directional hashes of one or more verifying documents, such as a scanned copy of passport verifying name and date of birth. Furthermore, the digital identity record may include one or more directional cryptographic hashes of biometric information of the user such as fingerprint data, retina scan data, and/or any other type of biometric information.

In some embodiments, document records stored on the system database 105 may comprise a data field containing document identifying hash values generated by an application server 103 according to a hashing algorithm implemented by a system blockchain, when a new document record containing a machine-readable computer file (e.g., PDF, DOC, XSL), such as transaction documents, is generated or updated. The hash value may be generated using one or more data fields that describe the computer file, which may be uploaded by a user via a website portal or pulled from the document record within the system database 105. The hash value may be a unique identifier for the particular document record, and may be used by various computing devices of the system 100, such as the system database 105, to reference the computer file or metadata describing the computer file, which may be stored in the system database 105 and/or on blocks of the system blockchain that is hosted on network nodes 111.

The system database 105 may further store a library of contract components and document components. A contract component may be, for example, a written term or a condition of a contract. For instance, a contract component for an electronic payment transaction may be a condition, such as a required level of security of a network connection, for a payor computing device to initiate a payment to a payee computing device through the network connection. A document component may be descriptive text, such as a glossary defining technical and legal terms within a contract. Another example of a document component may be a prospectus. In some implementations, the application server 103 may retrieve a plurality of contract and document components from the library and render the retrieved components on a graphical user interface (GUI) of the user device 109. A user may select and/or modify the contract and/or the document components and the application server 103 may generate an assembled contract text based on the user selecting and/or modifying the contract and/or document components. In other implementations, the application server may receive one or more files containing a written contract text and parse the contract text to match words, phrases, and/or sentences therein to contract and document components in the library. In some implementations, the system database 105 may also store addresses (e.g., hashes) of blocks containing smart contracts corresponding to the contract components and documents corresponding to the document components. In these implementations, the application server 103 may generate a contract block that contains references to the addresses of the blocks containing the smart contracts and the documents. In some implementations, the system database 105 may store the smart contracts corresponding to the contract components and documents corresponding to the document components. In these implementations, the application server 103 may retrieve the smart contracts and documents from the system database 105 and generate a code block (or a smart contract block) containing the retrieved smart contracts and documents.

A key storage database 107, sometimes referred in the art as a "high security module," "key appliance," "certificate authority," or the like, may be a computing device configured to manage and distribute encryption keys and cryptographic certificates to various computing devices in the system 100 according to predetermined roles and rules. In some implementations, encryption keys may be used for authentication of users when users log into a website hosted on a webserver 101. In some implementations, encryption keys may be used to encrypt the data blocks of the system blockchain. Additionally or alternatively, encryption keys may be used to confirm, or "sign," data transfers to confirm to a data transfer recipient that the data originated from a known party. Encryption keys may be also be used by users at an application level to apply a digital signature to a document or contract, which, in some cases, may trigger instructions from script code of a smart contract stored on the system blockchain.

The key storage database 107 may be hosted on any number computing devices comprising a non-transitory machine-readable storage medium and capable of performing the various tasks described herein. As shown in FIG. 1, the key storage database 105 may be accessed by a webserver 101 and/or an application server 103 via one or more networks, but the key storage database 105 may also be accessed by a user device 109 and network nodes 111 to retrieve or confirm encryption keys or encryption key signatures. Moreover, one having skill in the art would appreciate that the key storage database 107 may be hosted on the same physical computing device functioning as a webserver 101 and/or an application server 103.

Network nodes 111 may host one or more blocks of the system blockchain. A network node 111 may be any computing device comprising a processor and a non-transitory machine-readable storage medium capable of performing the various tasks and processes described herein. Non-limiting examples of a network node may be a workstation computer, laptop computer, tablet computer, and server computer. Although the network nodes 111 are described as storing blocks of the blockchain in FIG. 1, other computing devices, such as an application server 103, may host blocks of the blockchain. Each network node 111 may locally store an instance of the system blockchain in the storage medium of the system blockchain, and may further execute a software application that instructs the network node 111 on generating and querying blocks within the locally stored blockchain instance.

In operation, a network node may generate new blocks on a locally stored instance of the system blockchain according to data received from an application server 103 or other network nodes 111. In some instances, the application server 103 may update a local instance of the blockchain stored on the application server 103, and then instructs one or more of the network nodes 111 to update each blockchain instance stored on such network nodes 111. Moreover, the application server 103 may query the blocks of the system blockchain according to a block address stored in the system database 105. When the application server 103 executes the query of the blocks on the system blockchain, the application server 103 may poll the network nodes 111 to determine the most recent data on the system blockchain. The application server 103 may be confident that the data at block is the desired data according to a voting mechanism encoded within the blockchain software executed by the network nodes 111. Each network node 111 may receive the query for the block and block address, and return a response to the application server 103 indicating whether the block address contains the desired data. In this way, the application server 103 may be certain that data in the blockchain is resistant to corruption, as each blockchain instance on each network node 111 would need to be corrupted in the same way so that each block address is corrupted in the same way. Furthermore, the system blockchain may also disallow the application server 103 from acting on obsolete data. For instance, a network node 111a may execute a smart contract that instructs the network node 111a to generate a second block that updates data records in a first block on the local blockchain instance. In other words, the data records in the first block may be obsolete being superseded by the data records in the second block. After the update, the network node 111a may then accordingly instruct one or more remaining network nodes 111b, 111c and the application server 103 to update the respective local blockchain instances on those nodes 111b, 111c and application server 103. However, the application server 103 may not have updated its local blockchain instance before the application server 103 receives a data query or instruction for the updated data records from the user device 109 or smart contract. Prior to responding to the query, the application server 103 may use the voting mechanism to ascertain the latest valid blockchain. As the latest valid blockchain may contain the updated data record, such voting mechanism may protect against the application server 103 from acting on obsolete data and may keep the system blockchain resistant to data collisions.

A client device 109 may be any computing device allowing a user to interact with application server 103 via a webserver 101. The client device 109 may execute an Internet browser or local application that may access the webserver 101 in order to issue requests or instructions to the application server 103 to access the system blockchain. The client device 109 may transmit credentials from user inputs to the webserver 101, from which the webserver 101 may authenticate the user and, in some implementations, determine a user role. One having skill in the art would appreciate that the client device 109 may comprise any number of input devices configured to receive any number of data inputs, including various types of data inputs allowing for authentication (e.g., username, passwords, certificates, biometrics). One having skill in the art would also appreciate that the client device 109 may be any computing device comprising a processor and non-transitory machine-readable storage medium allowing the client device 109 to perform the various tasks and processes described herein.

As an example of the client device 109 operation, the client device may execute an Internet browser that accesses a webserver 101 hosting fund investment administration website that may allow access for fund managers, administrators and investors and other third parties to a common platform for the end-to-end administration of fund investments, using the device a fund manager may initiate fund lifecycle events such as a payment request associated with a capital call from investors, and investors may use the platform to view lifecycle events such as the capital call and associated payment obligations due in relation to their investments. Using the client device 109, an investor-user may select an investment in which to invest. As the transaction proceeds, the client devices 109 of the investor-user or a promoter-user may be used upload machine-readable computer files (e.g., PDF, DOC, XSL) containing transaction information. The system 100 may store the computer files into document records in a document database 105, which may then be added to blocks of the system blockchain, where the blocks are accessible according to block addresses that are then stored into the document record for the particular computer file. The client device 109 may issue queries or instructions to the application server 103 via the webpages generated by the webserver 101, which then instruct the application server 103 to query the blocks on the network nodes 111, and, in some instances, perform various tasks, such as retrieving or updating a file from the system database 105.

Figure 2:
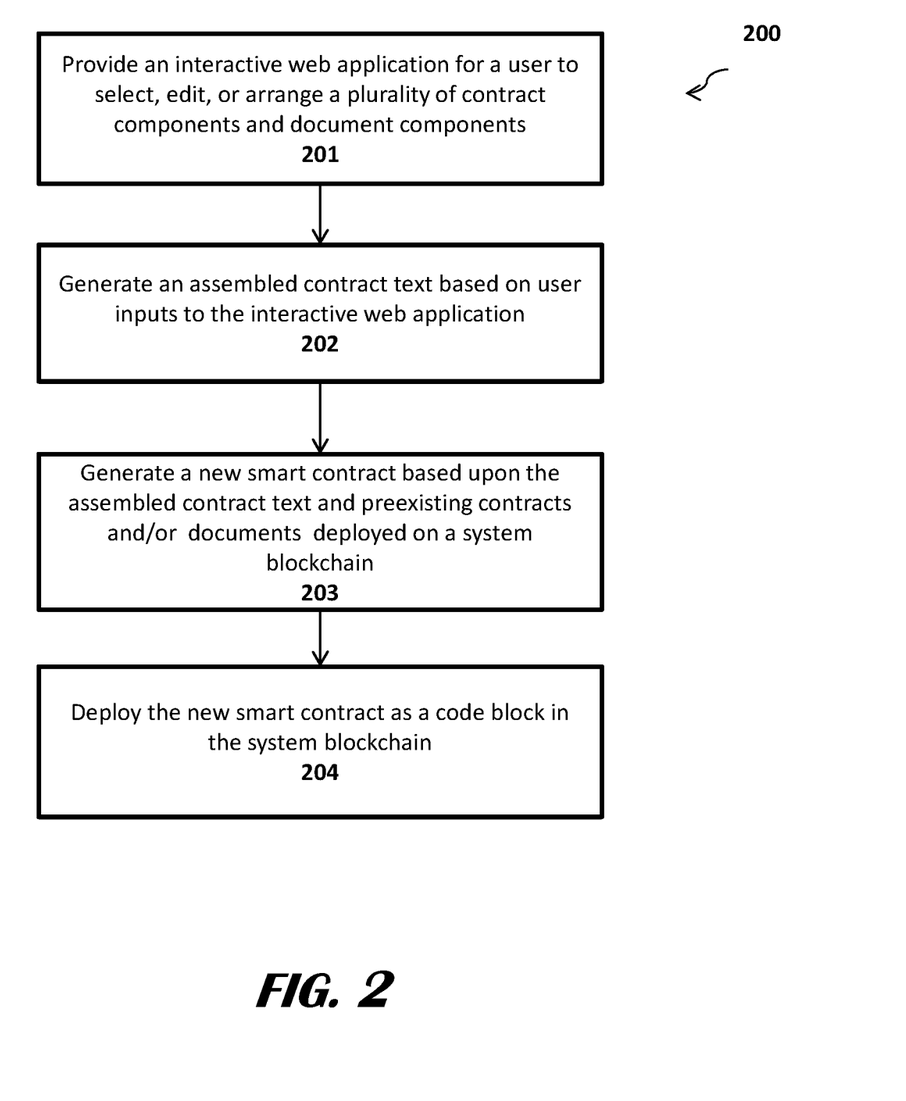
FIG. 2 shows an exemplary method 200 of generating a smart code block from a text based contract and deploying the code block to a blockchain, according to an exemplary embodiment.

FIG. 2 shows an exemplary method 200 of generating a code block from a text based contract and deploying the code block to a blockchain, according to an exemplary embodiment. Although one or more computing devices and one or more databases may implement one or more steps of the method 200, the following description details, for brevity, an application server and a database implementing the steps of the method 200. One having skill in the art will appreciate that some embodiments may comprise additional or alternative steps, or may omit several steps altogether.

In a first step 201, the application server may provide an interactive web application for a user to select, edit, or arrange a plurality of contract components and document components. In some implementations, the interactive web application may select contract components and document components from a library of contract and document components and render the selected contract components and document components. A contract component may be, for example, a written term or a condition of a contract. For instance, a contract component for an electronic payment transaction may be a condition, such as a required level of security of a network connection, for a payor computing device to initiate a payment to a payee computing device through the network connection. A document component may be descriptive text, such as a glossary defining technical and legal terms within a contract. Another example of a document component may be a prospectus. The contract and document components may contain snippets of text in any format such as MS-Word®, PDF, or text file. The application server may provide the interactive web application to the user via a web browser in the user's computer or mobile device. Alternatively or additionally, the application server may provide the web application as a downloadable application on the user's computer or mobile device. The web application may render a graphical user interface (GUI) with a plurality of interactive elements for the user to select, assemble, and modify contract and document components. For example, the web application may render a plurality of contract and document components as icons, dialog boxes, or options that a user can drag and drop on a contract template. In some implementations, the application server may allow the user to modify and edit the contract and document components. In some implementations, the interactive web application may present the user an interface to manually type a contract component or a document component. Furthermore, the application server may present an upload tool to the user that may allow the user to upload one or more contract or document components to the application server. The user may upload the one or more contract or document components in any format such as MS-Word®, PDF, or text file. In some implementations, the interactive web application may allow the user to upload or manually type the entirety of a contract or a document. In some implementations, the application server may update the library of contract and document components based on the aforementioned inputs and uploads received from the user. For example, the application server may update the library to include a contract component received from the user.

In a next step 202, the application server may generate an assembled contract text based on the user inputs to the interactive web application. The assembled contract text may contain one or more contract and/or document components provided to the user by the interactive web application. To generate the assembled contract text, the application server may aggregate the user's selections, edits, and modifications of the contract and/or document components. The application server may render the assembled contract text to user using the interactive web application. In some implementations, the application server may use a contract template to arrange the individual contract and/or document components in an ordered sequence to generate the assembled contract text.

In a next step 203, the application server may generate a new smart contract based upon the assembled contract text and existing contracts and/or documents deployed on a system blockchain. The application server my query the database to retrieve the block addresses of one or more blocks containing smart contracts corresponding to the contract components of the assembled contract text. The application server may further query the database to retrieve the block addresses of one or more blocks containing the document components. The database may include records containing the addresses (e.g., hashes) of individual blocks—in the system blockchain—containing the smart contracts corresponding to the contract components of the assembled contract text. Furthermore, the database may include records containing the addresses of individual blocks containing the document components of the assembled contract text. For example, the database may contain a first record indicating that a first smart contract corresponding to a first contract component is stored at block #ABC of the system blockchain and a second record indicating that a second smart contract corresponding to a second contract components is stored at block #DEF of the system blockchain, where #ABC and #DEF are block addresses for those particular blocks of the blockchain. Furthermore, the database may contain a third record indicating that a document component within the assembled contract text is stored at a block address #789. In this example, the new smart contract may include references to blocks #ABC, #DEF, and #789. In some implementations, the application server may use a hash algorithm to hash a contract component and use the resulting contract component digest to determine the address block of the corresponding smart contract. In these implementations, the address of a block in the system blockchain may be based upon the hash of the contents of the smart contract or any other data therein.

In a next step 204, the application server may deploy the new smart contract as a code block (or a smart contract block) in the blockchain. The application server may poll the network nodes and determine the latest valid blockchain. In some implementations, the application server may use a predetermined threshold for determining the latest valid blockchain. For example, the application server may query the network nodes for the latest blockchain. If the application server receives the same blockchain from 51% of the network nodes, the application server may determine that the received blockchain is the latest valid blockchain. One ordinarily skilled in the art appreciates that the predetermined threshold is set upon the level of integrity required for the data and instructions stored in the blockchain. The application server may use a higher predetermined threshold for data requiring a higher level of security and integrity, for example, electronic money transfers. After the application server determines the latest valid blockchain, the application server may deploy the new block to the blockchain. To do so, the application server may use the hash of contents of the last block of the latest valid blockchain as the address of the new block. In some implementations, the application server may use the hash of the contents of the last block and a nonce value as the address of the new block. Furthermore, the application server may encrypt the data in the new block by using a hashing algorithm, for example. For instance, the application server may hash portions of the new block separately to create intermediate hash values and generate a final hash value based on the intermediate hash values. Alternatively, the application server may hash the entire content of the new block to generate the final hash value.

Figure 3:
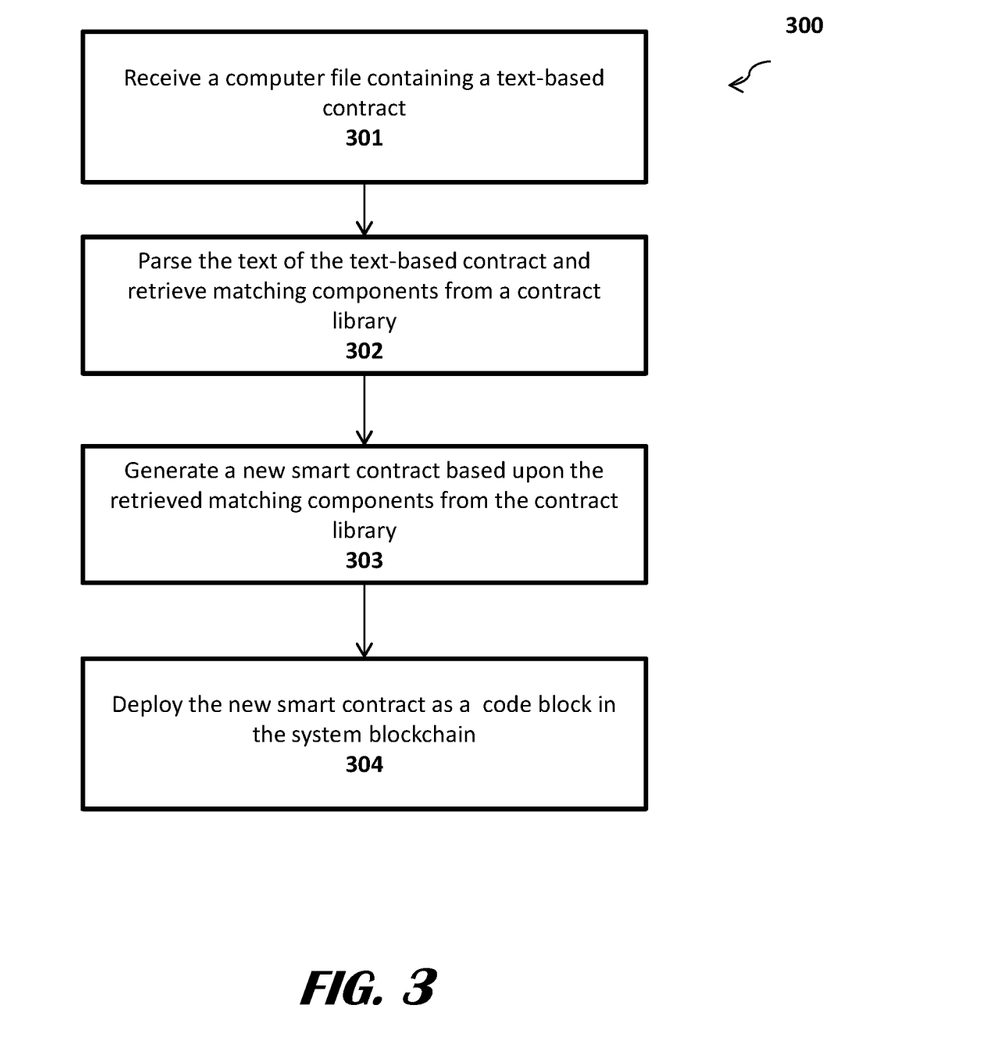
FIG. 3 shows an exemplary method 300 of generating a code block from a text based contract and deploying the code block to a blockchain, according to an exemplary embodiment.

FIG. 3 shows an exemplary method 300 of generating a code block from a text based contract and deploying the smart contract block to a system blockchain, according to an exemplary embodiment. Although one or more computing devices and one or more databases may implement one or more steps of the method 300, the following description details, for brevity, an application server and a database implementing the steps of the method 300. One having skill in the art will appreciate that some embodiments may comprise additional or alternative steps, or may omit several steps altogether.

In a first step 301, the application server may receive a text based contract. In some implementations, the application server may provide an interactive user interface for a user to upload the text-based contract. For example, the interactive user interface may render a document upload tool as a portion of a GUI seen by the user, as displayed on the client device. In some implementations, the application server may receive the text based contract via e-mail. The application server may receive the text based contract in any format, such as MS-Word®, PDF, or a plaintext file.

In a next step 302, the application server may parse the text based contract and retrieve matching components from a contract library. The application server may first parse the text based contract to determine whether the text based contract contains predetermined words, phrases, sentences, and/or paragraphs. Once the application server determines that the text based contract contains the predetermined words, phrases, sentences, and/or paragraphs, the application server may retrieve the matching components from a contract library. The contract library may be stored in the database and may include smart contracts and/or documents corresponding to the predetermined words, phrases, sentences, and/or paragraphs.

In a next step 303, the application server may generate a new smart contract based upon the retrieved matching components from the contract library. The new smart contract may include smart contracts and/or documents retrieved from the contract library. The smart contracts may include code that can be executed by the application server or other computing devices such as network nodes. The documents may include descriptive information such as legal addendums or prospectuses.

In a next step 304, the application server may deploy the new smart contract as a code block in the system blockchain. The application server may poll the network nodes and determine the latest valid blockchain. In some implementations, the application server may use a predetermined threshold for determining the latest valid blockchain. For example, the application server may query the network nodes for the latest blockchain. If the application server receives the same blockchain from 51% of the network nodes, the application server may determine that the received blockchain is the latest valid blockchain. One having ordinary skill in the art appreciates that the predetermined threshold is set upon the level of integrity required for the data and instructions stored in the blockchain. The application server may use a higher predetermined threshold for data requiring a higher level of security and integrity, for example, electronic money transfers. After the application server determines the latest valid blockchain, the application server may deploy the new block to the blockchain. To do so, the application server may use the hash of contents of the last block of the latest valid blockchain as the address of the new block. In some implementations, the application server may use the hash of the contents of the last block and a nonce value as the address of the new block. Furthermore, the application server may encrypt the data in the block by using a hashing algorithm, for example. For instance, the application server may hash portions of the new block separately to create intermediate hash values and generate a final hash value based on the intermediate hash values. Alternatively, the application server may hash the entire content of the new block to generate the final hash value.

Figure 4:
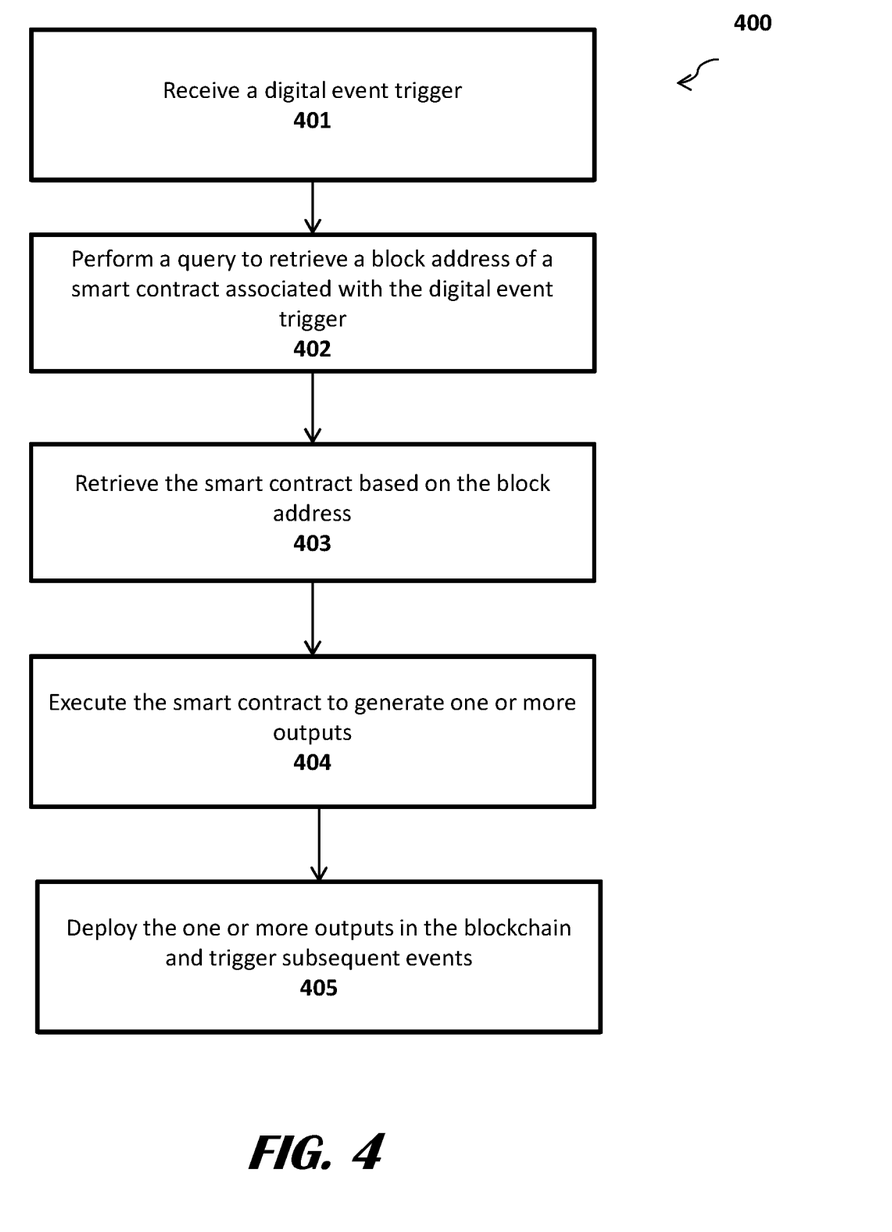
FIG. 4 shows an exemplary method 400 for intelligent auto-calculation, based on the one or more smart contracts deployed in a blockchain, according to an exemplary embodiment.

FIG. 4 shows an exemplary method 400 for intelligent auto-calculation, based on the one or more smart contracts deployed in a blockchain, according to an exemplary embodiment. Although multiple network nodes may implement various steps of the method 400, the description below includes a network node implementing the various steps for brevity. The network node may contain one or computing systems such as servers and/or client devices and one or more databases. Furthermore, one having ordinary skill in the art understands that additional steps may be added to the method 400, one or more steps may be substituted, and/or one or more steps may be skipped altogether.

In a first step 401, the network node may receive a digital event trigger. The digital event trigger, for example, may have been generated by a standalone application or a browser based application running on the network node. In addition or in the alternative, the digital event trigger may have been generated by other network nodes in communication with the network node. In some implementations, the digital event trigger may have been generated internally within a program being executed by the network node. That is, a first program module may generate the digital event trigger in response to detecting one or more conditions and transmit the digital event trigger to a second software module. The one or more conditions may be encoded in the software modules generating the digital event triggers.

As mentioned above, the one or more conditions that may cause a digital event trigger may be encoded in one or more software modules. In some implementations, the software modules may be a part of a software system that runs on multiple network nodes. Alternatively, the one or more software modules may be a part of a software system that runs on a single network node. Regardless, the encoded conditions may include, for example, a date, elapsed time, a counter reaching a certain numerical value, a user action, and other types of conditions. In some implementations, a respective software module may generate a digital event trigger when the software module determines that a system date received from an operating system or any other program in the computer matches the stored date. In some implementations, a software module may implement a timer function; and when the timer expires, the software module may generate a digital event trigger. In some implementations, the software module may implement a counter function, and generate a digital event trigger when the software module determines that the counter function has reached a certain numerical value. In these examples, the trigger points for the date, the elapsed time, the numerical value of the counter may be determined by other software modules based upon some processing one or more data records or a current state of a state machine. Alternatively, these trigger points may be manually coded into the respective software modules. In some implementations, a software module may generate a digital event trigger in response to receiving one or more inputs from a user interface associated with the network node and/or other network nodes. For example, a system user may input information the user interface or execute a code that passes pieces of information to the user interface API, and the software module implementing the user interface may transmit the received information the software module generating the digital even trigger. For example, a system user may input a request for a capital call from the user interface, and the software module implementing the user interface may transmit the received information to the trigger software module.

In some implementations, the digital event trigger may be implemented as a part of a smart code or smart contract. For example, the aforementioned software modules detecting one or more digital event triggers may be a part of a smart contract. These software modules may be the portion of the smart contract running locally on the network node and may invoke other portions of the smart contract stored in the blockchain as detailed below. In some implementations, one or more digital event triggers may be from one or more oracle sources.

In a next step 402, the network node may perform a query retrieve a block address of a smart contract (or a smart code) associated with the digital event trigger. The query may be any kind of a database query such as a structured query language (SQL) query to a database. In some implementations, the queried database may be stored locally within one or more non-transitory storages within the network node. In other implementations, the database may be stored and/or shared across multiple network nodes. The database may include, for example, data records with reference to one or more block addresses for a smart code associated with the digital event trigger. In some embodiments the network node may perform a blockchain query. One or more data blocks within the blockchain may include block addresses of the smart code associated with the digital event trigger. A blockchain query is detailed in description of step 403 below. One having ordinary skill in the art understands that the network node may download and validate a single blockchain for each of the steps 403, 404, and 405. Alternatively, the network node may perform separate blockchain downloads and validations for one or more of the steps 403, 404, and 405. Furthermore, the network node may not necessarily download and validate the entire blockchain, but may download just a portion thereof depending upon database query the network node may have to perform. The query may not have to be a single query but may contain multiple queries to multiple databases wherein each successive query may depend upon one or more preceding query. Once the network node retrieves the block address based upon one or more queries, the network node may execute next step 403.

In the next step 403, the network node may retrieve the smart contract (or smart code) based on the block-address. For retrieving the smart code, the network node may have to have a copy of the latest valid blockchain. To get a copy of the latest valid blockchain, the network node may transmit a request to other network nodes to transmit back the respective blockchains hosted by the other network nodes. The network node may compare the blockchains received from the other network nodes with each other and to the copy of the blockchain hosted by the blockchain node. In some implementations, such comparison includes the network node comparing the series of the cryptographic hashes indicating the block addresses of multiple blocks in the blockchain. In other implementations, the network node may compare one or more data records within the data blocks in addition to or as an alternative to comparing the series of cryptographic hashes. Regardless of the comparison protocol, the network mode may implement a consensus algorithm to ascertain the latest valid blockchain. The consensus algorithm may have different consensus thresholds based upon the criticality of the data records in the blockchain. For a more critical data, the network node may validate the latest blockchain if there is a more than fifty percent hit. That is, fifty percent of the received/stored blockchains match with one another, the network node may designate the blockchain to be a valid blockchain. In more critical systems, the threshold may be higher, such as ninety percent.

Once the network node has determined the latest valid blockchain, the network node may query the blockchain using the block address to retrieve the smart code. In some implementations, portions of smart code may have been stored in multiple blocks and the network node may have to do multiple queries using the multiple block addresses. In other implementations, the smart code may be in a single block of the blockchain and a single query would suffice. Once the smart code is retrieved, the network node may execute step 404.

In the next step 404, the network node may execute the smart code or smart contract to generate one or more outputs. For example, the smart code may perform an auto-calculation based implementation of a fund management fee scheme in a private equity context. For example, a fund manager may charge a hundred thousand dollars over a period of one year paid at quarterly intervals. The digital event trigger may be the current date reaching the predefined quarter-end date. Based on this digital event trigger generated by another software or a module within the smart contract itself, the smart contract may update a first data record associated with the fund to debit the quarterly payment and a second data record associated with the fund manager to credit the corresponding quarterly payment. In other words, some of the outputs of executing the smart contract may be a data record in a payment database for example, indicating a debit to the first data record and credit to the second data record. In some embodiments, a third party transaction server may execute the quarterly payments. The network node may transmit an indication to the third party transaction server that a payment should be effectuated; and the third party transaction server may transmit a transaction request to a banking server hosting an account associated with the private equity. The banking server may then transmit the payment to a second banking server hosting an account associated with the fund manager. In other embodiments, the distributed network nodes may maintain a separate payment system. That is, even though payment records are stored in the blockchain, the separate payment system associated with the distributed network nodes may process the aforementioned payments. The separate payment system may debit an account associated with the private equity and credit an account associated with the fund manager to effectuate a payment.

As another example, a digital event trigger may be associated with a late payment in a private equity context. After a predetermined payment due date is passed, the network node and/or network node may generate digital event trigger to retrieve a smart contract associated with the late payment implementing the aforementioned steps 401, 402, and 403. Upon execution of the smart contract, the smart contract may automatically calculate the late payment fees based on the one or more execution steps coded in the smart contract. For instance, the late payment fee may be a percentage of the amount due at the due date. In another instance, the late payment fee may be an amount pro-rated based on the number of days elapsed since the passage of the due date. One having ordinary skill in the art understands that these intelligent auto-calculations are merely exemplary, and other types and forms of auto-calculations should be considered to be within the scope of this disclosure.

In a next step 405, the network node may deploy the one or more outputs to the blockchain and trigger subsequent events. In some implementations, the network node may download a new latest valid blockchain based upon one or more consensus algorithm prior to deploying the one or more outputs to the blockchain. In other implementations, the network node may use the blockchain validated in the previous steps to deploy the one or more outputs to the blockchain. Continuing with the above example of management fees, some of the outputs may be the respective updates to the first and second data records and another corresponding update to the payment database. To deploy these outputs to the blockchain, the network node may retrieve a portion of the last block in the blockchain. For example, a hash value within the last block of the blockchain may indicate the block address or a portion thereof the next block to be appended to the blockchain. According, the network node may retrieve this hash value and may use this hash value as the address of the new block to be appended to the blockchain. Alternatively, the network node may generate a cryptographic hash of the hash value with a portion of data records in the new block to be deployed in the blockchain. The network node may also generate a cryptographic hash of at least a portion of the data records within the new block to generate a hash value for the new block, wherein the generated hash value may be used as or used to generate the block address of a subsequent block in the blockchain. One having ordinary skill in the art understands that the aforementioned block linking mechanism is merely exemplary and other block linking mechanisms should be considered to be within the scope of this disclosure.

In some embodiments, the network node may trigger one or more subsequent events based on the one or more outputs. For example, the network node may transmit a notification to a user interface associated with a fund participant that a fund management payment has been made to a fund manager. In another example, the network node may transmit a notification to the user interface associated with the fund participant with a token about payment obligation. In some instances, the network node may trigger more smart contract executed events or transactions such as creation of cash obligation tokens. A cash obligation token or alternatively, a digital payment token may be a data record containing one or more data fields with pieces of information associated with a payment obligation. For example, the one or more data fields may contain information of a payment amount, a payee-user, and a payor-user. In other instances, the network node may trigger API driven events and/or other blockchain based events.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims. Furthermore, qualifiers "a" and "an" before a logical block, a module, a circuit, and an algorithm are not intended to be limiting, and multiple such components should be considered to be within the scope of this disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer implemented method for generating and deploying a code block in a blockchain, the method comprising:
    rendering, by a network node, a graphical user interface (GUI) containing a plurality of contract components and a plurality of document components retrieved from a library database of contract and document components;
    generating, by the network node, an assembled contract text based on a selection of at least one contract component from the plurality of contract components or at least one document component from the plurality of document components;
    retrieving, by the network node, an address of an executable code corresponding to the at least one contract component or an address of a text of the at least one document component from the library database of contract and document components;
    retrieving, by the network node, a first latest valid blockchain based upon a first polling of a plurality of network nodes using a consensus threshold;
    generating, by the network node, a code block containing the address of the executable code corresponding to the at least one contract component or the address of the text of the at least one document component;
    generating, by the network node, a block address for the code block based upon a cryptographic hash value of at least a portion of data records of a last block of the first latest valid blockchain; and
    appending, by the network node, the code block at the generated block address in the first latest valid blockchain.

2. The method of claim 1, further comprising
    in response to detecting a digital event trigger by the network node:
        associating, by the network node, the digital event trigger to the deployed code block;
        retrieving, by the network node, a second latest valid blockchain based upon a second polling of the plurality of network nodes using the consensus threshold;
        downloading, by the network node, the code block to a memory of the network node;
        retrieving, by the network node, an executable code corresponding to the at least one contract component based on the address of the executable code; and
        executing, by the network node, the executable code to generate one or more outputs.

3. The method of claim 2, further comprising:
    updating, by the network node, one or more databases based on the one or more outputs.

4. The method of claim 2, further comprising:
    generating, by the network node, a blockchain block containing the one or more outputs; and
    appending, by the network node, the blockchain block to the second latest valid blockchain.

5. The method of claim 2, wherein the digital event trigger comprises at least one of: a predetermined date, a predetermined point in time, a predetermined duration of time; a predetermined number in a counter, an outcome of an intelligent autocalculation, an outcome of an API event, an outcome of a blockchain event, a user action on a web interface and an input from an administrative user.

6. The method of claim 1, further comprising:
    rendering, by the network node, a graphical contract template for arranging the at least one contract component or the at least one document component.

7. The method of claim 1, wherein the address of the executable code is a block address within each of the first and second latest valid blockchains.

8. The method of claim 1, wherein the address of the executable code is an address of a database record in the library database of contract and document components.

9. A computer implemented method for generating and deploying a code block in a blockchain, the method comprising:
  rendering, by a network node, a graphical user interface (GUI) containing a plurality of contract components and a plurality of document components retrieved from a library database of contract and document components;
  generating, by the network node, an assembled contract text based on a selection of at least one contract component from the plurality of contract components or at least one document component from the plurality of document components;
  retrieving, by the network node, an executable code corresponding to the at least one contract component or a text of the at least one document component from the library database of contract and document components;
  retrieving, by the network node, a first latest valid blockchain based upon a first polling of a plurality of network nodes using a consensus threshold;
  generating, by the network node, a code block containing the executable code corresponding to the at least one contract component or the text of the at least one document component;
  generating, by the network node, a block address for the code block based upon a cryptographic hash value of at least a portion of data records of a last block of the first latest valid blockchain; and
  appending, by the network node, the code block at the generated block address in the first latest valid blockchain.

10. The method of claim 9, further comprising
in response to detecting a digital event trigger by the network node:
  associating, by the network node, the digital event trigger to the deployed code block;
  retrieving, by the network node, a second latest valid blockchain based upon a second polling of the plurality of network nodes using the consensus threshold;
  downloading, by the network node, the code block to a memory of the network node; and
  executing, by the network node, the executable code in the code block to generate one or more outputs.

11. The method of claim 10, further comprising:
updating, by the network node, one or more databases based on the one or more outputs.

12. The method of claim 10, further comprising:
generating, by the network node, an output block containing the one or more outputs; and
appending, by the network node, the output block to the second latest valid blockchain.

13. The method of claim 10, wherein the digital event trigger comprises at least one of: a predetermined date, a predetermined point in time, a predetermined duration of time; a predetermined number in a counter, an outcome of an intelligent autocalculation, an outcome of an API event, an outcome of a blockchain event, a user action on a web interface, and an input from an admin user.

14. The method of claim 9, further comprising:
receiving, by the network node, a contract component or a document component from a user;
generating, by the network node, the assembled contract text to include the contract component or the document component received from the user; and
updating, by the network node, the library database to include the contract component or the document component received from the user.

15. A system for generating and deploying a code block in a blockchain, the system comprising:
  a plurality of network nodes, each including a non-transitory storage medium storing a respective local copy of a blockchain;
  at least one of the plurality of network nodes having a processor configured to:
    rendering a graphical user interface (GUI) containing a plurality of contract components and a plurality of document components retrieved from a library database of contract and document components;
    generate an assembled contract text based on a selection of at least one contract component from the plurality of contract components or at least one document component from the plurality of document components;
    retrieve an executable code corresponding to the at least one contract component or a text of the at least one document component from the library database of contract and document components;
    retrieve a first latest valid blockchain based upon a first polling of a plurality of network nodes using a consensus threshold;
    generate a code block containing the executable code corresponding to the at least one contract component or the text of the at least one document component;
    generate a block address for the code block based upon a cryptographic hash value of at least a portion of data records of a last block of the first latest valid blockchain; and
    append the code block at the generated block address in the first latest valid blockchain.

16. The method of claim 15, wherein the processor is further configured to:
in response to detecting a digital event trigger:
  associate the digital event trigger to the code block;
  retrieve the latest valid blockchain based upon a second polling of the plurality of network nodes using the consensus threshold;
  download the code block to a memory of the network node;
  execute the executable code in the code block to generate one or more outputs.

17. The method of claim 16, wherein the processor is further configured to:
update one or more databases based on the one or more outputs.

18. The method of claim 16, wherein the processor is further configured to:
generate an output block containing the one or more outputs; and
append the output block to the second latest valid blockchain.

19. The method of claim 16, wherein the digital event trigger comprises at least one of: a predetermined date, a predetermined point in time, a predetermined duration of time; a predetermined number in a counter, an outcome of an intelligent autocalculation, an outcome of an API event, an outcome of a blockchain event, a user action on a web interface, and an input from an admin user.

20. The method of claim 15, wherein the processor is further configured to:

render a contract template for arranging the at least one contract component or the at least one document component.

\* \* \* \* \*